United States Patent [19]
Pabst et al.

[11] Patent Number: 5,075,587
[45] Date of Patent: Dec. 24, 1991

[54] HIGH-PRESSURE METAL VAPOR DISCHARGE LAMP, AND METHOD OF ITS MANUFACTURE

[75] Inventors: Wolfgang Pabst, Lindau; Stefan Juengst, Kirchseeon; Dieter Brunner, Bayreuth, all of Fed. Rep. of Germany

[73] Assignee: Patent Treuhand Gesellschaft für elektrische Glühlampen mbH, Munich, Fed. Rep. of Germany

[21] Appl. No.: 440,777

[22] Filed: Nov. 22, 1989

[30] Foreign Application Priority Data

Dec. 1, 1988 [DE] Fed. Rep. of Germany ....... 3840577

[51] Int. Cl.$^5$ .................. H01J 17/16; H01J 61/30; H01J 9/26; H01J 9/38
[52] U.S. Cl. .................. 313/25; 313/633; 313/634; 313/636; 313/639; 445/26; 445/40; 445/43
[58] Field of Search .............. 313/631, 636, 637, 638, 313/639, 640, 641, 642, 643, 633, 634, 565; 445/26, 40, 43, 38

[56] References Cited

U.S. PATENT DOCUMENTS

| | | |
|---|---|---|
| 4,150,317 | 4/1979 | Laska et al. . |
| 4,156,826 | 5/1979 | Hernqvist . |
| 4,481,300 | 11/1984 | Hartnett et al. . |
| 4,687,969 | 8/1987 | Kajihara et al. ............. 313/625 |
| 4,689,519 | 8/1987 | Ooms et al. ............. 313/112 |
| 4,766,097 | 8/1988 | Shinozaki et al. ............. 501/98 |
| 4,777,399 | 10/1988 | Miyazaki et al. ............. 313/54 |
| 4,827,176 | 5/1989 | Inukai et al. ............. 313/638 |
| 4,949,004 | 8/1990 | Yamazaki et al. ............. 313/565 |

FOREIGN PATENT DOCUMENTS

| | | |
|---|---|---|
| 0209345 | 1/1987 | European Pat. Off. . |
| 0272930 | 6/1988 | European Pat. Off. . |
| 3530921 | 3/1987 | Fed. Rep. of Germany . |
| 1513887 | 2/1968 | France . |
| 2595876 | 9/1987 | France . |
| 60-193254 | 1/1985 | Japan . |

*Primary Examiner*—Donald J. Yusko
*Assistant Examiner*—John E. Gilist
*Attorney, Agent, or Firm*—Frishauf, Holtz, Goodman & Woodward

[57] ABSTRACT

A high-pressure metal vapor discharge lamp, for example and specifically a metal halide vapor discharge lamp, has a discharge vessel, in which electrodes are fitted from both ends, in form of an elongated ceramic hollow body, in which, in accordance with the invention, the ceramic is translucent, high-purity aluminum nitride (AlN). The end portions are closed off by closing electrodes in form of either solid pins or rods, from which electrode elements carried on shafts (13) extend, or a hollow tube (19) fitted into the end portion of the aluminum nitride discharge vessel and pinched and soldered shut. The solid or tubular closing elements can be inserted into a pre-sintered discharge vessel, preferably under inert atmospheric conditions, in a meticulously clean environment. For translucidness, the high-purity aluminum nitride should have less than 0.05% of metal cations, which may cause coloring or discoloration, less than 0.01% iron as two or three valent ions, and less than 0.01% of silicon or tungsten carbide (all percentages by weight), but may contain dopings between 0.01% and 5% of oxides or fluorides of the metals yttrium, calcium, neodymium, lanthenum and/or aluminum.

35 Claims, 5 Drawing Sheets

HIGH-PRESSURE METAL VAPOR DISCHARGE LAMP, AND METHOD OF ITS MANUFACTURE

Reference to related patents, the disclosure of which is hereby incorporated by reference:
U.S. Pat. No. 4,689,519
U.S. Pat. No. 4,687,969
U.S. Pat. No. 4,766,097

The present invention relates to a high-pressure discharge lamp, and more particularly to a high-pressure discharge lamp which includes a metal vapor, and, optionally, a metal halide vapor, in other words, which includes a fill which is highly corrosive with respect to the vessel of the high-pressure discharge lamp; and especially to metal halide high-pressure discharge lamps which are suitable for general service illumination, of relatively low power ratings, for example in the range of between about 35 to 200 W.

BACKGROUND

Metal halide discharge lamps usually include discharge vessels made of high silicon content glass, and especially of quartz glass, see for example U.S. Pat. No. 4,689,519. Quartz glass is corrosion resistant with respect to vaporized metal halides. Difficulties with quartz glass, however, are unfortunately endemic, for example due to the possibility of devitrification, and insufficient acceptance of thermal loading. In general illumination use, the maximum temperature that quartz glass can be used with is about 1000° C. The poor heat conductivity of quartz glass, namely about 0.1 W/mK, also interferes with the illumination qualities of the lamp which, on the other hand, are important in general service illumination.

It has been tried to construct metal halide discharge lamps with ceramic discharge vessels. U.S. Pat. No. 4,687,969 describes such an experiment, which utilizes a ceramic discharge vessel made of aluminum oxide, $Al_2O_3$. The thermal loading of the vessel can be substantially improved, since the maximum temperature of the material for lamp use is about 1700° C. On the other hand, however, problems in connection with resistance to corrosion arise, particularly in the region of the seal between the ceramic vessel and an end plug. The use of a niobium tube, well known in the construction of sodium high-pressure discharge lamps, which has a thermal coefficient of expansion roughly matched to that of aluminum oxide, cannot be used due to the lack of corrosion resistance. It has, therefore, been proposed, and as described in U.S. Pat. No. 4,687,989, to use Cermet plugs. One of the Cermet plugs is sintered into the tube, and the other end of the tube has the Cermet plug sealed in by means of a frit. This solution is expensive to manufacture and the lifetime of the lamp is not satisfactory.

Aluminum nitride, AlN, has been used as a ceramic substrate in the semiconductor technology field see U.S. Pat. No. 4,766,097. This material, as used for semiconductor substrates, is not transparent.

THE INVENTION

It is an object to provide a discharge vessel for metal vapor high-pressure lamps, and more particularly for metal halide vapor high-pressure lamps, which permits high thermal loading and is resistant to the corrosive effect of the metal vapor, and especially metal halide vapor fill; and to provide a method for its manufacture which is simple and compatible with existing manufacturing methods in the lamp field.

Briefly, the lamp has a ceramic discharge vessel which is made of AlN of extremely high purity, e.g. at least 99.95%, with less than 0.01% silicon and less than 0.01% iron (by weight), preferably in the range of about 99.99% AlN purity, so that essentially transparent AlN is obtained, with sufficient light transmissivity for use in lamps.

In accordance with a feature of the invention, a hollow elongated body of the high-purity ceramic is pre-sintered in a highly purified atmosphere, and tungsten rods are inserted into the end portions of the tubular body to form the sealed end closures. Before both end closures are inserted, a fill is introduced into the body which includes an inert gas and a metallic and/or metal halide fill component, in liquid or solid form. The closing plugs, which at the same time can form the connecting rods for the electrodes are then sintered into the tubular body.

In accordance with another feature of the invention, the ceramic body is pre-sintered, and one electrode with a short shaft, is introduced into one end, whereas the other electrode is a metallic tube having a long shaft. The metallic tube is used to pump out the hollow ceramic body and replace any air therein with the fill gas, and also to introduce the metallic and/or metal halide fill components thereinto, the tubular body, after the fill has been introduced, being pinched or compressed shut and additionally soldered shut.

The structure, and the method for making it, has the advantage that an essentially isothermal discharge vessel is obtained, and the end closures are simple and provide for an effective seal. The sealing method provides a durable and long-time reliable connection between the end plugs or end elements, respectively, and the discharge vessel.

It has been found important in the manufacture of AlN high transparency discharge vessel to use starting materials of extremely high purity; and, further, to carry out manufacture and shaping of the ceramic body under conditions of extreme cleanliness. Rub-off of tools of, for example, tungsten carbide, might result in deposits of foreign substances in the ceramic body, and result in contaminants thereof. With respect to cleanliness and purity, it has been found that traces of silicon and iron especially interfere with transparency of the discharge vessel. With respect to contaminants by silicon and iron, a purity of at least 99.99%, by weight, of AlN is necessary in order to obtain the desired transparency of the material of about at least 80%, so that it will be suitable for lamp use.

In accordance with a feature of the invention, it has been found desirable to add trace doping substances of oxides or fluorides of predetermined metals. These additives facilitate sintering, since they permit sintering at lower temperatures and under lower pressure and improve the facility of the ceramic to form a tight connection with sealing elements, known as such, for example solders. The optical transparency is not impaired by such doping substances.

The discharge vessel, in accordance with the invention, has substantial advantages for use in lamps. AlN has a high temperature tolerance, and such a lamp vessel permits a maximum temperature of about 1700° C., and therefore, in contrast to quartz glass, permits substantially higher thermal loading. This increases the light efficacy and improves the color quality thereof.

Furthermore, AlN is corrosion resistant with respect to the halides of the fill and permits use of corrosion resistant metallic lead-throughs or end portions, thus increasing the lifetime of the lamp.

Use of AlN thus permits combination of the advantages of $Al_2O_3$ and of quartz glass without, however, having to accept the disadvantages of either of them.

Use of AlN ceramics has another advantage: it has a high thermal conductivity, about 150 W/mK, which is at least six times that of $Al_2O_3$. This permits the construction of discharge vessels which are essentially isothermal, and thus particularly suitable for metal halide discharge lamps.

The specific resistance of AlN ceramic could also be increased to such an extent, by a factor of about 1000, that it can be used in discharge vessels.

AlN has another advantage in the lamp field, namely that the thermal coefficient of expansion of AlN is similar to that of tungsten, namely:

AlN: $5.4 \times 10^{-6}$/K
tungsten: $5.2 \times 10^{-6}$/K.

This similarity in thermal coefficient of expansion permits directly connecting through-leads into a discharge vessel, and forming the through-leads of massive tungsten pins, bolts or rods, fitted into the ends of the ceramic discharge vessel body. These discharge vessel bodies are usually in tubular shape, or may be bulged outwardly in ellipsoid shape. Lead-throughs of this type are then resistant against corrosion by halides.

The electrode leads can also be formed in a different way, namely by using a cap, for example of molybdenum, fitted cup-like over a tubular end of the ceramic discharge vessel. Such a cap utilizes the feature that the thermal coefficient of expansion of molybdenum is slightly higher than that of AlN. The ceramic, in operation, remains under compression, resulting in particularly high strength and tightness of the through-lead.

In accordance with another feature of the invention, the through-lead can be in form of a metallic tube formed of corrosion resistant material which, at the same time, permits evacuating of the vessel and filling it with the required fill, the corrosion resistant metal tube being matched in diameter to that of the opening in the ceramic body.

DETAILED DESCRIPTION

Figure 1:
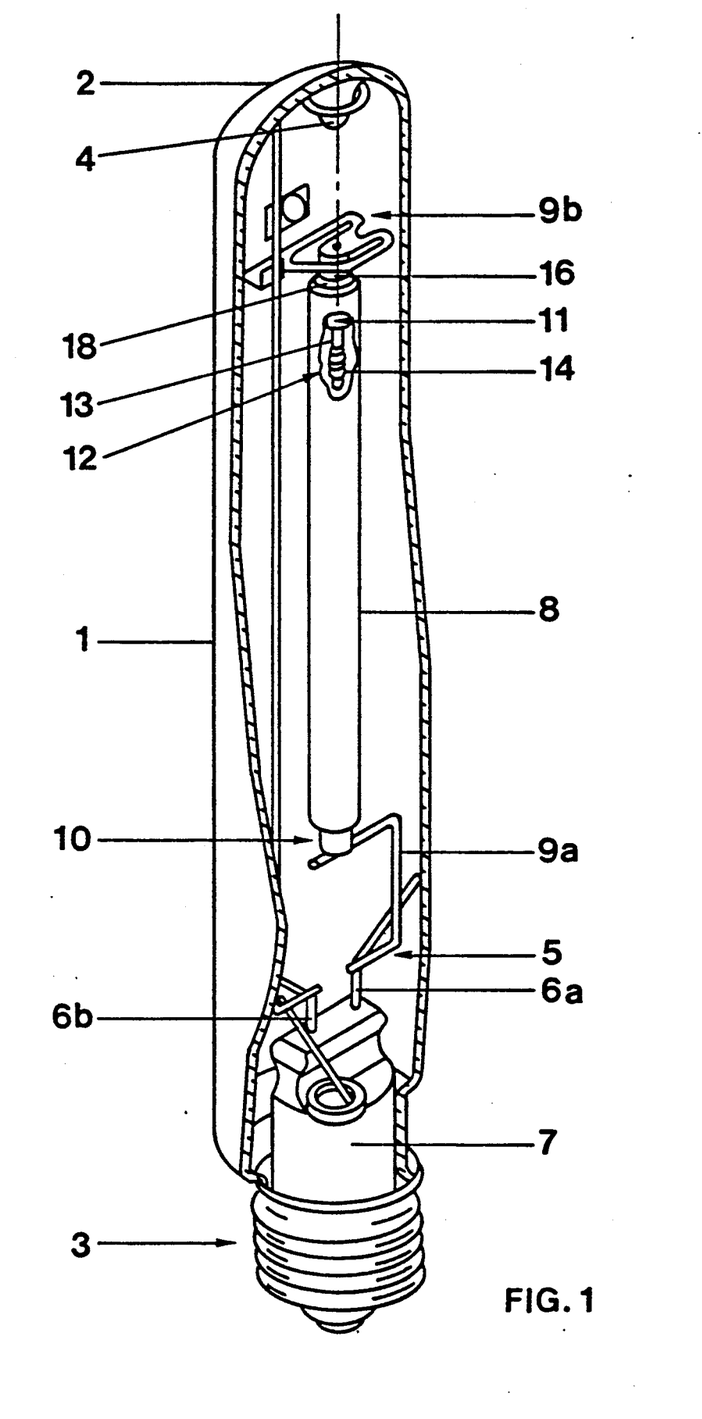
FIG. 1 is a side view, partly cut away, of a high-pressure discharge lamp.

FIG. 1 illustrates, schematically, a 75 W metal halide discharge lamp. The lamp has an outer envelope of hard glass, defining a lamp axis. The hard glass outer envelope is closed off with a cap 2 at one end, the other end being fitted into a standard Edison base 3. A nipple 4 is formed on the cap 2, extending inwardly, to provide a centering and holding portion for a mounting structure 5. The mounting structure 5 has two current supply leads 6a, 6b which, insulated from each other, are secured through a flare-type mount 7 in the base 3. The holding structure 5 secures a cylindrical discharge vessel 8, located axially within the outer envelope 1. A conductor 9a is connected to the lead-in 6a and to one end portion 10 of the discharge vessel 8; a conductor 9b, in form of a leaf spring, is welded to the other lead-in 6b.

In accordance with the present invention, the discharge vessel 8 is formed of high purity AlN ceramic.

The holding arrangement for the discharge vessel 8 takes into consideration thermal expansion of the discharge vessel during operation of the lamp. The electrode and current supply connection 16 extending from the inside of the discharge vessel 8 to the leaf spring 9b is formed as a massive metallic rod, and extends axially upwardly. The connecting lead 6b, likewise, is a rod element to which the leaf spring 9b is welded. The rod element 6b extends upwardly to the end cap 2 of the vessel, and is there bent into a part-circular portion, surrounding the nipple 4.

The two end portions 10, 11 (FIG. 2) of the lamp are solid tungsten rods. The tungsten may have a small amount of additives of potassium, silicon, and aluminum, known commercially as BSD material. The tungsten rods 10, 11 have electrodes 12 fitted therein. The electrodes 12 are formed of a shaft element 13 and a wrap or winding 14 adjacent the discharge end of the electrodes. The spacing between the electrodes is about 7 mm. Within the discharge vessel 8 there is a fill which includes an inert base gas, for example argon; mercury, and additives of holmium iodide or bromide and dysprosium iodide or bromide.

Figure 2:
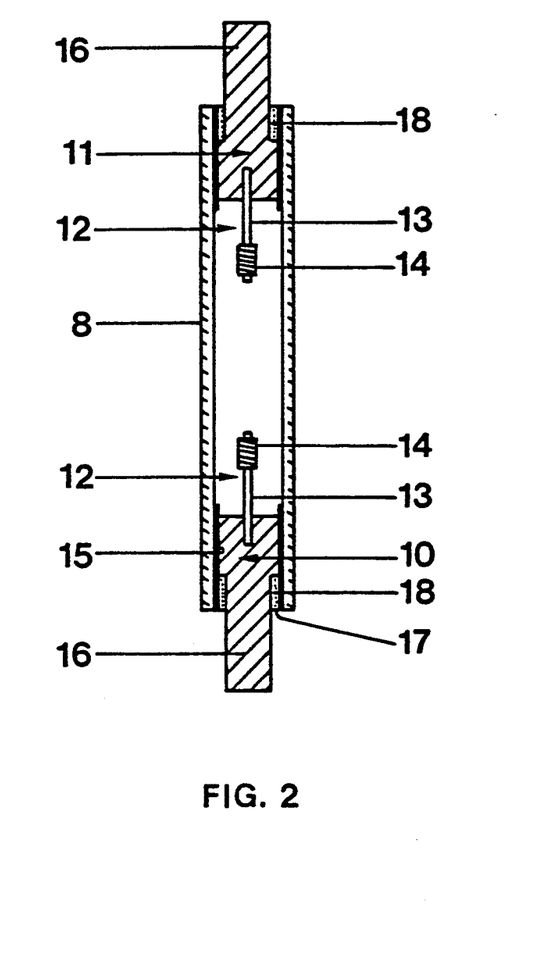
FIG. 2 is a fragmentary side view of the discharge vessel showing one form of lead-through and electrode construction.

The use of aluminum nitride, in accordance with the invention, for the discharge vessel 8 permits raising the temperature of the cold spot within the discharge tube, in operation of the lamp, to about 1200° C. As a consequence, the luminous efficacy derived from a comparable conventional quartz glass metal halide lamp is raised by about 20%. The color temperature is about 3500 K. The color Index Ra is about 90, that is, is in the step or range 1. Other types of fill may be used for the lamp; for example, the fill may include sodium iodide or bromide or tin iodide or bromide.

Discharge vessels made, in accordance with the invention, of high purity AlN ceramics, are also suitable for other types of high-pressure discharge lamps, such as sodium high-pressure discharge lamps, which include, besides noble gas, mercury and sodium in the fill.

The discharge vessel 8 of FIG. 2 may, for example, have a wall thickness of 0.8 mm, and an inner diameter (ID) of 6 mm; the overall length of the vessel may be about 3 cm. Depending on power rating of the lamp, the wall thickness is preferably in the range of from about 0.2 to 1 mm, with an inner diameter preferably between about 4 to 10 mm. A coating 15 is applied to the inner walls of the body 8 at the end regions thereof. This coating is a thin layer of tungsten, having a thickness of 10 micrometers, on which an aluminum nitride layer, with additives, is applied. The ends are then sealed by solid bolts, rods or pins of tungsten shown at 10 and 11. The outer diameter of the tungsten pins or rods is matched to the inner diameter of the hollow body 8, and they have a length of about 1 cm. The material of the pins, and especially for higher power lamps, preferably has an additive of about 3 to 5% rhenium to increase the recrystallization temperature. All percentages in this specification, unless otherwise noted, are by weight. The pins 10, 11 have a reduced diameter at the outer region 16, which has a length of 7 mm, and form a circumferential, circular pocket 17. This pocket 17 permits the insertion of a sealing element 18 formed of a solder, for example a metal oxide solder, and a component assisting sintering, for example AlN powder. The outwardly projecting portion of the pin 16 is used to connect the pin to the holding structure, and provide both for mechanical as well as electrical connection of the discharge vessel and the electrodes therein.

Figure 3:
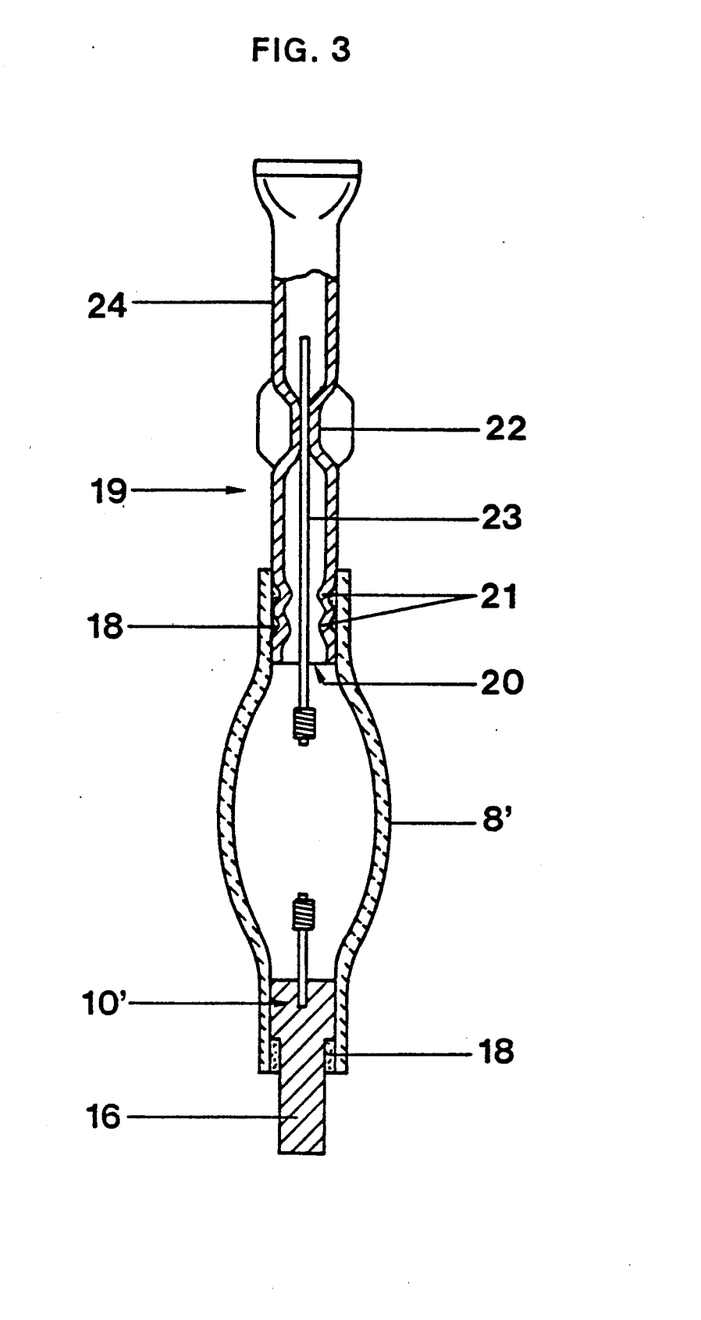
FIG. 3 is a vertical sectional view through a lamp showing another type of electrode introduction and placement.

The end portion of the pin 16 may be formed differently, for example instead of being formed as a reduced portion, having grooves formed therein (see FIG. 3). The end portion of the pins 10, 11, at the inside and facing the discharge, is formed with a central opening into which the electrode shaft 13 is fitted.

The discharge vessel structure 8 need not be a straight tubular element as shown in FIG. 2. Rather, and as shown in FIG. 3, the discharge region of the vessel 8 may be in ellipsoid form 8'. One of the end portions 10' is constructed as described in connection with FIG. 2, without, however, having the inner thin layer 15 of tungsten. The pin 10' is sintered directly into the end portion of the vessel 8'. The second end portion of the vessel 8' has a metallic tube 19 fitted therein which has an outer diameter matching the inner diameter of the tubular end portion of the ellipsoid 8'. The length of the metallic tube is about 3 cm. Only a small partial region 20 is fitted into the tubular end portion of the discharge vessel 8'. The region 20 is formed with grooves 21 to place a sealing substance or solder 18 therein. The metallic tube 19, approximately centrally of its length, is formed with a flat pinched constriction 22 which holds the end of the comparatively long electrode shaft 23. This constriction 22 is located outside of the vessel 8'. The remaining end portion 24 of the metallic tube 19 is used to provide a connection tab or end for electrical connection and mechanical holding of the discharge vessel. It is also pinched at the end and soldered shut to be gas, air and vacuum-tight.

The metallic tube 19, preferably, is made of sintered tungsten. This material is particularly suitable since its thermal coefficient of expansion matches that of the ceramic which, in accordance with the present invention, is AlN. Additionally, the sintered tungsten tube 19 has excellent resistance againt corrosion, and permits a particularly good tight connection and seal.

Lamps of different types, and for lower loading and having lesser corrosion, may use metallic tubes of different types, for example an iron-nickel-cobalt alloy, commercially known under the name VACON, and having a high melting point. Fills of particularly high corrosive effect, for example fills including sodium and tin iodide components and building up complex molecules, also may use molybdenum tubes. They have been found particularly advantageous in highly corrosive environments, since molybdenum is extremely resistant to corrosion and its thermal coefficient of expansion is only slightly above that of the AlN ceramic.

Figure 4:
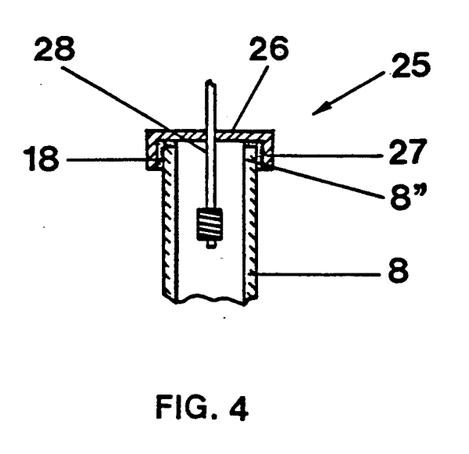
FIG. 4 is a fragmentary view of a discharge vessel with an end cap.

In accordance with a feature of the invention, the lamp electrode holding structure may also be formed as a cap 25, see FIG. 4, which is fitted on an end 8'' of the discharge tube 8 or 8'. The cap has a cross or bottom portion 26 which fits against the flat end surface of the end portion 8'' of the discharge vessel, and a depending surrounding ridge-like rim 27, which surrounds the end 8''. The inner diameter of the rim 27 is matched essentially to the outer diameter of the tubular end portion 8''; a sealing solder 18 is introduced between, on the one hand, the rim 27 and the bottom portion 26 and, on the other hand, the end portion 8'' of the discharge vessel. The electrode shaft 28 extends centrally through the bottom part 26 of the end cap 25.

Molybdenum is the preferred material for the cap 25, since its slightly higher thermal coefficient of expansion has the result that, in operation of the lamp, the rim 27 of the cap surrounds the end 8' of the ceramic discharge vessel 8 particularly tightly.

The discharge vessels, in accordance with the present invention, may be made, in preferred form, as follows:

In accordance with the present invention, a discharge vessel, for example of the type shown in FIG. 2, and having two tungsten pins 10, 11 extending through end portions of the discharge vessel 8, 8', starts by first pre-sintering the discharge vessel in an atmosphere of inert high purity gas, preferably nitrogen, $N_2$, having a purity of 99.9999%. A tungsten layer is then applied to the inner end portions in form of a paste, to facilitate vacuum-tight bonding between the discharge vessel 8, or 8', and the tungsten pin 16. A further layer is applied over the tungsten layer to form, together with it, the layer 15. This further layer is made of AlN powder with a solder additive of 0.9% $Nd_2O_3$ and 0.2% of $Y_2O_3$. This solder is of substantial importance for the quality of the bonding, since it is corrosion resistant and also high temperature resistant. Customary solders, such as a metal solder formed of silver, copper and titanium, that is, an AgCuTi solder, are not suitable for use in the severe operating environment to which lamps of this type can be subjected.

The shafts 13 of the electrodes 12 are fitted into the respective openings at the front inside of the tungsten pins and there secured by soldering or welding. The shafts 13 can also be press-fitted into the tungsten pins 10, 11. As another possibility, the tungsten pins 10, 11 and the electrode shafts 13 can be formed as a single element.

Further handling is done in a glove box which, after repeated flushing, is filled with an inert gas, for example argon. Within the glove box, a first pin 10 or 11 is fitted into a first end of the ceramic vessel 8, or 8'. The pocket 17 (FIG. 2) or the grooves 21 between ridges (FIG. 3) are additionally filled with a mixture of aluminum nitride powder and solder. The solder which can be applied as a powder or a wire is a metal oxide solder of rare earths, particularly neodymium, yttrium, or lanthanum. These mixtures in the pockets or grooves improve the vacuum and gas-tight seal. The first electrode is then tightly sintered to the end of the discharge vessel. During sintering, the material of the solder melts.

Metal containing fill components in solid form, for example encapsulated mercury, metal halide in form of a tablet, or a capsule which contains mercury as well as metal halides, are then filled into the other, still open end of the discharge vessel. The second tungsten pin, for example pin 11, is then fitted in the second end of the discharge vessel, the sealing material 18, described above, is introduced into the pocket 17 (FIG. 2) or within groove 21 (FIG. 3). At that time, the inert gas atmosphere within at least a portion of the glove box, is set to that of the fill pressure, for example about 50 Torr. The second tungsten pin is then sintered into the end portion of the discharge vessel 8, 8'. The first, already sintered pin, in whose vicinity are located the metal containing fill components, is cooled during this second sintering step.

Rather than using the through-pins 10, 11, the method can also be used to fit the end cap 25 (FIG. 4)

over an end portion 8" of the respective discharge vessel 8 or 8'.

In accordance with another feature of the invention, the vacuum-tight connection between the ceramic tube 8, 8' and a tungsten pin can be made by not applying the layers to the ends of the ceramic tube and using the additional sealing substance 18. Rather, the pin is introduced into the end of the ceramic while it is still "green," that is, has not yet undergone final firing. Upon firing of the ceramic, carried out in a nitrogen atmosphere under normal, that is atmospheric pressure, as well known, the ceramic will shrink, resulting in a vacuum tight connection between the connecting element within the ceramic tube 8, 8' and the connecting element 10, 11, 19, itself.

In accordance with another feature of the invention, and particularly applicable to the structure of FIG. 3, in which the metallic tube 19 is made of molybdenum, the ceramic tube 8, 8' is first presintered and then the end portions, forming the electrode connections and plugs, are fitted into the presintered ceramic tube. Of course, the electrodes are included in the end portions. One of the end portions, for example as shown in FIG. 3, may use the solid tungsten pin 10', and it is sealed and tightly sintered, similarly to the metallic tube 19. The electrode 23 previously had been inserted into the metallic tube 19 and retained therein by a pinch compression connection 22. The tube 19, as well as the pin 10', can be sintered as above described, that is, directly or with sealing substances. Upon direct sintering, the pockets 17 need not be used; also, the grooves 21 in the metallic tube 19 are not needed.

At the time of sintering, the metallic tube 19 is still open at its upper end, with reference to FIG. 3. The ceramic tube, with the electrodes inserted, is flushed and evacuated through the still open upper end of the metallic tube 19. The fill is then introduced in powder or liquid form through the metallic tube. Inert gas, likewise, is placed into the discharge vessel through the metallic tube. When all the fill has been placed into the discharge vessel, the inert gas has been added, the metallic tube is pinched shut and soldered closed.

If the metallic tube is made of sintered tungsten powder, a core pin or mandrel is used during its manufacture, on which the tungsten powder is applied in mud form and on which the green ceramic is pulled. Then, both the mud tungsten powder and the green ceramic are conjointly sintered together.

Various changes and modifications may be made; the outer envelope 1 (FIG. 1) for example need not be tubular as shown in FIG. 1, but may be in form of an ellipsoid; this is particularly desirable when the operating temperatures of the discharge vessels are high.

Figure 5:
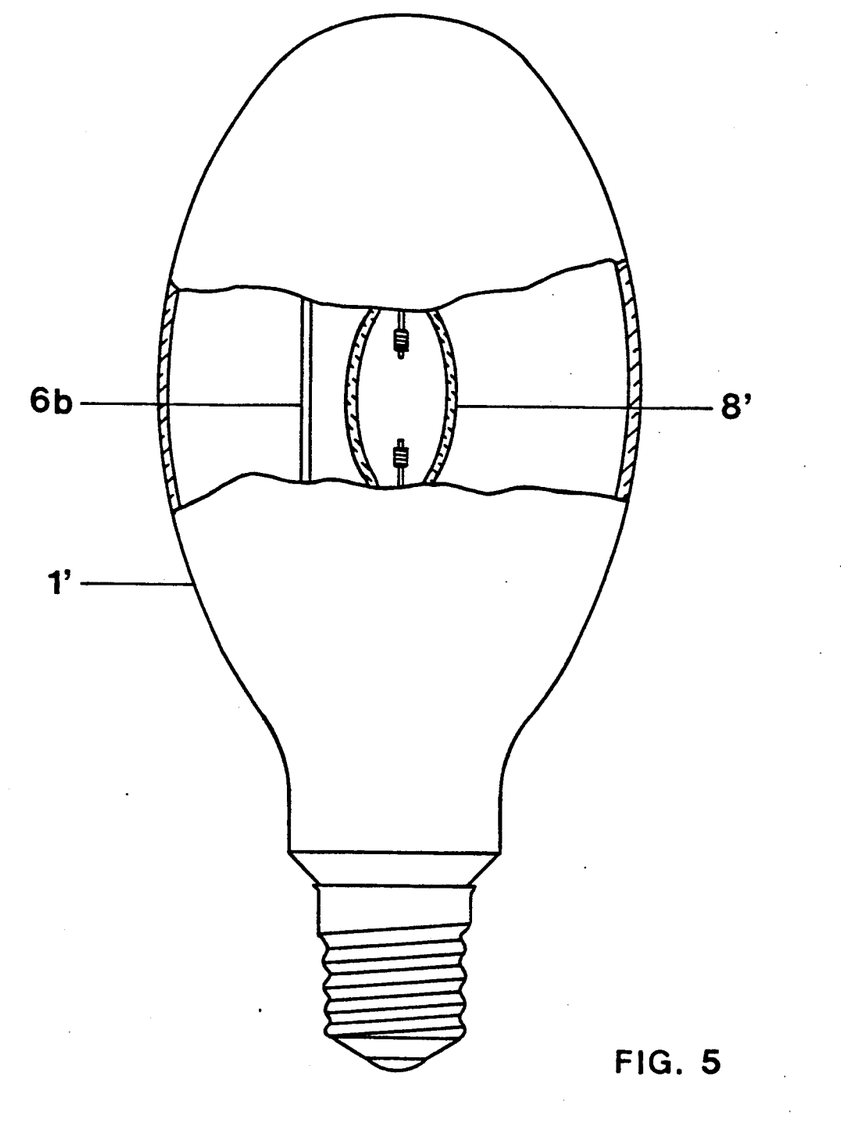
FIG. 5 is a lamp with an ellipsoidal outer bulb.

The color temperature at times depends on the position of the lamp during operation. If an ellipsoid-shaped discharge vessel 8' is used, see FIG. 3, particularly good isothermal conditions will obtain, which reduces the dependence of color temperature on operating position of the lamp. With such structures, an ellipsoid-shaped outer bulb 1' is particularly desirable, as will be obvious (FIG. 5).

The choice of the particular type of end plug, that is, whether the solid pins 10, 11, 10', the end cap 25 (FIG. 4) or a tubular connection 19 (FIG. 3), as well as the method used to make the connection, will depend on the type of lamp. Direct sintering is of advantage in higher powered lamps; in lower powered lamps, the technology using sealing and connection solders are more suitable.

Generally, therefore, the AlN ceramic should be so pure that it contains less than 0.05% (by weight) of metal cations which may introduce coloring or clouding thereto, and specifically less than 0.01% iron in the form of two and/or three valent ions. The sealing solder preferably contains one or more metal oxides; the metallic tube 19 is preferably either tungsten or an alloy of nickel and/or iron and/or cobalt.

The metallic vapor is preferably mercury and the metal halide are iodides or bromides of rare earth metals. Suitable metal halides are the iodides or bromides of tin and/or indium and/or thallium and/or scandium and/or sodium. Metallic vapors of mercury and sodium alone may be used.

Various other changes and modifications may be made, and any features described herein may be used with any of the others, within the scope of the inventive concept.

We claim:

1. High-pressure metal vapor discharge lamp comprising
   an elongated hollow ceramic body (8, 8') having two end portions;
   closing means (10, 11; 10', 19) closing off the end portions thereof,
   said closing means including an electrode (12) having an electrode shaft (13) extending inwardly of the hollow body;
   a fill of inert gas and at least one metal which, in operation of the lamp, vaporizes, and, optionally, metal halides within said body; and
   wherein, the hollow body is translucent high-purity aluminum nitride (AlN) which includes less than 0.01% silicon and less than 0.01% iron, by weight.

2. The lamp of claim 1, wherein the ceramic hollow body of aluminum nitride includes less than about 0.05% of metallic cations, by weight.

3. The lamp of claim 1, wherein the ceramic hollow body includes less than 0.01% iron having two or three valent ions, by weight.

4. The lamp of claim 1, wherein the ceramic hollow body includes less than 0.01% tungsten carbide, by weight.

5. The lamp of claim 1, wherein the ceramic hollow body comprises a doping material, wherein the doping material consists of at least one material of the group consisting of an oxide or fluoride of the metals yytrium, or calcium, or neodymium, or lanthanum, or aluminum.

6. The lamp of claim 5, wherein the proportion of doping material is between 0.01 to 5%, by weight.

7. The lamp of claim 1, wherein (FIG. 2) the hollow body is cylindrical.

8. The lamp of claim 1, wherein (FIG. 3) the hollow body is ellipsoid-shaped.

9. The lamp of claim 1, wherein at least one of said closing means comprises a solid pin or rod of tungsten (10, 11; 10').

10. The lamp of claim 9, wherein the outer diameter (OD) of the pin or rod is matched to and fits into the inner diameter of the end portion of the hollow body in which the pin or rod is fitted.

11. The lamp of claim 9, wherein the pin or rod (10, 11) of tungsten has an axial region (16) of reduced diameter located at the side thereof remote from the discharge region within the hollow body.

12. The lamp of claim 9, wherein the tungsten pin or rod (10') is directly sintered to the elongated ceramic hollow body.

13. The lamp of claim 9, wherein the tungsten pin or rod includes rhenium as an additive.

14. The lamp of claim 9, further including a bonding layer (15) positioned at the inner surface of the respective end portion of the hollow body for sealing the pin or rod thereto, said bonding layer (15) comprising tungsten powder.

15. The lamp of claim 9, further including a sealing substance (18) sealing the tungsten pin or rod (10, 11, 10') to the end portion of the hollow body.

16. The lamp of claim 15, wherein the outer region of the end portion of the elongated ceramic hoilow body and said pin or rod form a pocket (17);
and wherein said sealing substance (18) is located in said pocket.

17. The lamp of claim 9, wherein said solid tungsten pin or rod (10, 11; 10') is formed with an opening at the end portion thereof facing inwardly of the hollow body, and said electrode shaft (13) is fitted into said opening.

18. The lamp of claim 1, wherein at least one of said closing means comprises a metallic tube (19) of corrosion resistant metal having an outer diameter fitted to and matching the inner diameter of the end portion of said hollow body, said metallic tube extending outside of the hollow body and being closed externally thereof.

19. The lamp of claim 18, wherein said hollow body (19) is formed with a pinch or press constriction (22), and said electrode shaft (23) is retained in said pinch or press constriction.

20. The lamp of claim 18, wherein the metallic tube (19) is formed with at least one groove (21) in the region of the end portion of the hollow body;
and a sealing substance (18) is located in said groove (21) and seals the metallic tube to the hollow body.

21. The lamp of claim 15, wherein said sealing substance includes aluminum nitride powder.

22. The lamp of claim 20, wherein said sealing substance includes aluminum nitride powder.

23. The lamp of claim 15, wherein said sealing substance includes a solder comprising at least one metal oxide.

24. The lamp of claim 18, wherein the metallic tube comprises tungsten or an alloy of at least two of the metals of the group consisting of: nickel, iron, cobalt.

25. The lamp of claim 1, wherein at least one of the closing means comprises a metallic cap element (25) fitted over a respective end portion of the elongated ceramic hollow body and including a rim (27) surrounding an end region of the end portion of the hollow body, said rim having an inner diameter fitting over and matched to the outer diameter of the ceramic hollow body.

26. The lamp of claim 25, wherein said cap element comprises molybdenum.

27. The lamp of claim 1, further including a transparent outer envelope (1) surrounding said elongated ceramic hollow body.

28. The lamp of claim 27, wherein said outer envelope comprises an ellipsoid or a cylindrical tube.

29. The lamp of claim 1, wherein the metallic vapor comprises a vapor of mercury, and wherein the optional metal halides consists of at least one of the group of: iodides of rare earth metals; bromides of rare earth metals.

30. The lamp of claim 1, wherein the metallic vapor, in operation, is mercury vapor, and the metal halides are an iodide or a bromide of at least one of the group consisting of: tin (Sn), indium (In), thallium (Tl), scandium (Sc), sodium (Na), thorium (Th).

31. The lamp of claim 1, wherein the metallic vapors are vaporized mercury and sodium.

32. The lamp of claim 1, wherein said aluminum nitride (AlN) has a purity of about 99.99%.

33. A method to make a high-pressure metal vapor lamp, wherein said lamp has
a discharge vessel including an elongated ceramic hollow body having two end portions of translucent high-purity aluminum nitride (AlN), which includes less than 0.01% silicon and less than 0.01% iron, by weight;
closing means (10, 11; 10', 19) closing off the end portions of the hollow body,
said closing means including an electrode (12) having an electrode shaft (13) extending inwardly of the discharge vessel; and
a fill of an inert gas and at least one metal vapor within said discharge lamp,
said discharge vessel having two end portions; and
at least one of said closing means comprises a metallic tube (19) of corrosion resistant material, having an outer diameter matched to the inner diameter of the end portion of the ceramic hollow body, and extending beyond and outside of the discharge vessel,
said method comprising the steps of:
pre-sintering the ceramic hollow body in high-purity atmosphere;
connecting a first closing means (10, 11, 10') with one end portion of the discharge vessel;
forming at least one groove (21) in that one of the end portions of the metallic tube (19) which will extend, upon assembly, in the end portion of said elongated ceramic hollow body forming the discharge vessel;
introducing a solder into said at least one groove, and fitting said metallic tube within the end portion of the elongated ceramic hollow body;
sintering the closing means at one end of said elongated hollow body and simultaneously soldering the metal tube to the hollow body in the region of the groove;
evacuating the discharge vessel and filling the discharge vessel with inert gas through the hollow tube;
filling metal containing fill substances in liquid or solid form through the metallic tube (19);
and finally closing the metallic tube by pinch-sealing and soldering the portion thereof extending beyond the discharge vessel, whereby the high purity of the aluminum nitride of the discharge vessel will be obtained.

34. The method of claim 33, wherein the step of introducing the solder material comprises placing the solder material into the at least one groove (21) in form of at least one of:
a wire;
a powder.

35. A method to make a high-pressure metal vapor lamp, wherein said lamp has
a discharge vessel including an elongated ceramic hollow body of translucent high-purity aluminum nitride (AlN), which includes less than 0.01% silicon and less than 0.01% iron, by weight;

closing means (10, 11; 10') closing off the end portions of the hollow body, said closing means including an electrode (12) having an electrode shaft (13) extending inwardly of the discharge vessel; and a fill of an inert gas and at least one metal vapor within said discharge lamp, said discharge vessel having two end portions; and said closing means comprising a solid pin or rod (10, 11; 10') of tungsten, said method comprising the steps of:

pre-sintering the ceramic hollow body in a high-purity inert atmosphere;

optionally coating the end portions of the hollow body with a substance having the characteristics of at least one of: sealing, bonding;

connecting the electrodes to said tungsten pins or rods;

in an inert gas atmosphere, fitting a first pin or rod, with the electrode facing inside of the hollow body, into a first end portion of the hollow body;

in an inert gas atmosphere, introducing a metal containing fill in liquid or solid form into the discharge vessel;

in an inert gas atmosphere, fitting a second pin or rod, with the electrode facing the inside of the discharge vessel, in the end portion of the hollow body;

optionally filling sealing substance in spaces formed adjacent the end portions of the hollow body; and tightly sintering the pins or rods to the hollow body, whereby the high purity of the aluminum nitride of the discharge vessel will be obtained.

* * * * *